United States Patent
Pedersen (10) Patent No.: US 11,754,054 B2
(45) Date of Patent: Sep. 12, 2023

(54) PUMP SYSTEM FOR LUBRICATING COMPONENTS OF A WIND TURBINE

(71) Applicant: Vestas Wind Systems A/S, Aarhus (DK)

(72) Inventor: Jan Hove Pedersen, Risskov (DK)

(73) Assignee: Vestas Wind Systems A/S, Aarhus N (DK)

( * ) Notice: Subject to any disclaimer, the term of this patent is extended or adjusted under 35 U.S.C. 154(b) by 423 days.

(21) Appl. No.: 16/973,067

(22) PCT Filed: May 29, 2019

(86) PCT No.: PCT/DK2019/050170
§ 371 (c)(1),
(2) Date: Dec. 8, 2020

(87) PCT Pub. No.: WO2020/001715
PCT Pub. Date: Jan. 2, 2020

(65) Prior Publication Data
US 2021/0246884 A1 Aug. 12, 2021

(30) Foreign Application Priority Data

Jun. 25, 2018 (DK) .......................... PA 2018 70438

(51) Int. Cl.
*F03D 80/70* (2016.01)
*F16H 3/00* (2006.01)
(Continued)

(52) U.S. Cl.
CPC ............. *F03D 80/70* (2016.05); *F16H 3/005* (2013.01); *F16H 57/0436* (2013.01); *F16N 7/38* (2013.01);
(Continued)

(58) Field of Classification Search
CPC ...... F03D 80/70; F16H 3/005; F16H 57/0436; F16H 2200/0034; F16H 2200/2005;
(Continued)

(56) References Cited

U.S. PATENT DOCUMENTS 7,662,059 B2 * 2/2010 McCune ................. F01D 25/20
184/6.12
8,365,866 B2 * 2/2013 Ciszak .................... F03D 80/70
184/6.12
(Continued)

FOREIGN PATENT DOCUMENTS

CA 2708906 A1 8/2011
CA 2715920 A1 8/2011
(Continued)

OTHER PUBLICATIONS

China National Intellectual Property Administration, 2nd Notification of Office Action in CN Application No. 201980042354.3, dated Jan. 19, 2022.
(Continued)

*Primary Examiner* — Michael A Riegelman
(74) *Attorney, Agent, or Firm* — Wood Herron & Evans LLP (57) ABSTRACT

A pump system for supplying lubricant to components of a wind turbine comprises: a pump for pumping lubricant through a fluid circuit of the wind turbine; a drive means for driving the pump; and, a gearbox arrangement arranged to couple the drive means to the pump. The gearbox arrangement comprises a rotatable input shaft configured to be driven by the drive means and a rotatable output shaft configured to drive the pump. The input shaft is rotatable in a first direction of rotation and a second direction of rotation when driven by the drive means. The output shaft is rotatable in the first direction of rotation, and the speed of rotation of the output shaft is determined by an operational mode of the
(Continued)

gearbox arrangement. In a first mode of operation, when the input shaft rotates in the first direction of rotation at a first speed of rotation, the gearbox arrangement is configured to drive the output shaft to rotate also in the first direction of rotation at the first speed of rotation. In a second mode of operation, when the input shaft rotates in the second direction of rotation at the first speed of rotation, the gearbox arrangement is configured to drive the output shaft to rotate in the first direction of rotation at a second speed of rotation.

11 Claims, 5 Drawing Sheets

(51) Int. Cl.
*F16H 57/04* (2010.01)
*F16N 7/38* (2006.01)

(52) U.S. Cl.
CPC .. *F05B 2260/98* (2013.01); *F16H 2200/0034* (2013.01); *F16H 2200/2005* (2013.01); *F16H 2200/2082* (2013.01); *F16N 2210/025* (2013.01)

(58) Field of Classification Search
CPC ............... F16H 2200/2082; F16N 7/38; F16N 2210/025; F05B 2260/98
See application file for complete search history.

(56) References Cited

U.S. PATENT DOCUMENTS

| | | | | |
|---|---|---|---|---|
| 8,657,714 B1* | 2/2014 | Ghanime | ............ | F16C 33/1065 |
| | | | | 384/380 |
| 8,702,373 B1* | 4/2014 | Valva | ................. | F16H 57/0479 |
| | | | | 416/174 |
| 10,041,489 B2* | 8/2018 | Parnin | ....................... | F02C 7/06 |
| 10,107,157 B2* | 10/2018 | Roberge | .................... | F02C 7/06 |
| 10,823,006 B2* | 11/2020 | Leque | ..................... | F01D 15/08 |
| 11,319,837 B2* | 5/2022 | Leque | ....................... | F02C 7/32 |
| 2005/0272548 A1* | 12/2005 | Nagai | ................. | F16H 61/0295 |
| | | | | 475/91 |
| 2006/0205553 A1* | 9/2006 | Lee | ......................... | F16H 3/724 |
| | | | | 475/5 |
| 2007/0113703 A1* | 5/2007 | Himmelmann | ....... | F16H 37/065 |
| | | | | 74/661 |
| 2010/0018808 A1* | 1/2010 | Gloge | .................. | F16H 61/0031 |
| | | | | 184/6.12 |
| 2011/0252906 A1* | 10/2011 | Harashima | .............. | F01C 17/02 |
| | | | | 74/325 |
| 2012/0241258 A1* | 9/2012 | Subramaniam | ........... | F16N 7/40 |
| | | | | 184/6.4 |
| 2013/0247539 A1* | 9/2013 | Hoppe | ....................... | F02C 7/32 |
| | | | | 60/39.15 |
| 2016/0222975 A1* | 8/2016 | Sheridan | ................ | F04D 19/005 |
| 2017/0122330 A1* | 5/2017 | Mastro | ................... | F04D 29/325 |
| 2019/0292943 A1* | 9/2019 | Sheridan | .................... | F02C 7/32 |
| 2020/0291817 A1* | 9/2020 | Leque | .................... | F16H 57/045 |
| 2021/0246884 A1* | 8/2021 | Pedersen | ................. | F16N 13/10 |
| 2023/0046366 A1* | 2/2023 | Nielsen | ................... | F03D 80/70 |

FOREIGN PATENT DOCUMENTS

| | | |
|---|---|---|
| CN | 1759243 A | 4/2006 |
| CN | 104534072 A | 4/2015 |
| DE | 102016013574 A1 | 5/2017 |
| DE | 102017117600 A1 | 3/2018 |
| EP | 2270358 A2 | 1/2011 |
| EP | 2977315 A1 | 1/2016 |
| EP | 3040553 A1 | 7/2016 |
| GB | 1582401 A | 1/1981 |
| RU | 2656938 C1 | 6/2018 |

OTHER PUBLICATIONS

European Patent Office, International Search Report and Written Opinion in PCT Application No. PCT/DK2019/050170, dated Aug. 19, 2019.
Danish Patent and Trademark Office, Search and Examination Report in PA 2018 70438, dated Jan. 8, 2019.
China National Intellectual Property Administration, First Notification of Office Action in CN Application No. 201980042354.3, dated Aug. 2, 2021.

* cited by examiner

PUMP SYSTEM FOR LUBRICATING COMPONENTS OF A WIND TURBINE

FIELD OF THE INVENTION

The invention relates to a pump system for a wind turbine, in particular but not exclusively to a lubrication system.

BACKGROUND OF THE INVENTION

The lubrication system of a wind turbine functions to supply lubricant to various rotating components of the wind turbine, such as the main bearing, generator and the gearbox, to name a few. In some lubrication systems, the pump for pumping the lubricant is directly driven by a motor whose drive shaft is coupled to a drive shaft of the pump.

During cold start-up of a wind turbine, before the wind turbine systems have reached their normal operating temperatures, the lubricant is colder and more viscous than during normal operation. This causes pressure losses throughout the system to be higher than at normal operation. The more viscous lubricant is also more difficult to pump, such that the pump requires more torque to be supplied from the motor during cold start-up, this being especially relevant in gear pumps. As such, cold start-up requirements are often the driver of the motor size, which may mean a comparatively large motor is needed to drive the pump at low temperatures. However, a large motor will run outside its optimum load area in normal operation and hence run at reduced efficiency.

One way to avoid this increased motor torque/motor size requirement during cold start-up is to drive the motor at a lower than nominal speed. This may be achieved, for example, by using either a multispeed motor, or by controlling the motor speed via a Variable Frequency Drive (VFD). However, this is not an ideal solution, as reduced motor speed limits the power that the motor can induce into the oil via the pump (reduced flow and heat contribution).

It is against this background that the invention has been devised.

SUMMARY

In a first aspect, the embodiments of the invention provide a pump system for supplying lubricant to components of a wind turbine. The pump system comprises a pump for pumping lubricant through a fluid circuit of the wind turbine, a drive means for driving the pump, and a gearbox arrangement arranged to couple the drive means to the pump. The gearbox arrangement comprises a rotatable input shaft configured to be driven by the drive means and a rotatable output shaft configured to drive the pump. The input shaft is rotatable in a first direction of rotation and a second direction of rotation when driven by the drive means. The output shaft is rotatable in the first direction of rotation, and the speed of rotation of the output shaft is determined by an operational mode of the gearbox arrangement. In a first mode of operation, when the input shaft rotates in the first direction of rotation at a first speed of rotation, the gearbox arrangement is configured to drive the output shaft to rotate also in the first direction of rotation at the first speed of rotation. In a second mode of operation, when the input shaft rotates in the second direction of rotation at the first speed of rotation, the gearbox arrangement is configured to drive the output shaft to rotate in the first direction of rotation at a second speed of rotation.

The second speed of rotation may be lower than the first speed of rotation.

The gearbox arrangement may comprise an epicyclic gear set. The epicyclic gear set may provide a gear ratio in the range of 2:1 to 4:1 in the second mode of operation, such that the first speed of rotation is in the range of two to four times faster than the second speed of rotation in the second mode of operation.

The epicyclic gear set may comprise a sun gear, a plurality of planet gears and a ring gear. The sun gear may be coupled to the input shaft so that rotation of the input shaft drives rotation of the sun gear. The ring gear may be coupled to the output shaft so that rotation of the ring gear drives rotation of the output shaft.

The planet gears may be mounted on a carrier so as to be rotatable about rotational axis, $r_p$, and about a central axis of the gear set, $r_s$. The gearbox arrangement may comprise a carrier coupling configured to allow rotation of the carrier about central axis, $r_s$, in the first direction and prevent rotation of the carrier about central axis, $r_s$, in the second direction.

The gearbox arrangement may comprise a sun gear coupling configured to rotationally couple the sun gear and the ring gear when the sun gear rotates in the first direction of rotation, but to allow relative rotation between the sun gear and the ring gear when the sun gear rotates in the second direction of rotation.

In a first embodiment, the sun gear coupling may comprise a unidirectional clutch associated with at least one of said planet gears and configured to allow rotation of the planet gear about its rotational axis, $r_p$, in the first direction and prevent rotation of the planet gear about its rotational axis, $r_p$, in the second direction.

In a second embodiment, the sun gear coupling may comprise a mechanical coupling configured to directly couple rotation of the sun and ring gears when the sun gear rotates in the first direction of rotation, but to allow relative rotation between the sun gear and the ring gear when the sun gear rotates in the second direction of rotation. In this embodiment, rotation of the sun and ring gears is not coupled by means of the planet gears when the sun gear rotates in the first direction of rotation, but instead by means of a direct mechanical coupling between the sun and ring gears.

In another aspect, the invention provides a wind turbine comprising a pump system as described in the preceding paragraphs.

BRIEF DESCRIPTION OF THE DRAWINGS

Embodiments of the present invention will now be described in detail with references to the accompanying drawings, in which.

DETAILED DESCRIPTION

The embodiments of the invention relate to a pump system for supplying lubricant to rotating components of a wind turbine. In known lubricant pump systems, the electric motor used to drive the pump is usually required to be over-rated for operation in normal temperature ranges in order to have the power to drive the pump during cold temperature operation. This means that, typically, a larger and heavier motor is needed just to account for the current draw required during cold temperature start-up. However, assuming that a standard motor is used, such a motor is not optimised for operating at normal temperatures, which makes it less efficient.

The pump system of the invention incorporates a gearbox arrangement that functions to reduce the rate at which a lubrication pump is driven, simply by reversing the direction of rotation of a driving motor of the pump. As will be explained, this allows for the motor torque required to drive the lubricant pump during cold start-up, when the lubricant is colder and more viscous, to be reduced. In this way, the pump system enables use of a smaller and lower cost motor than in traditional set-ups.

Figure 1:
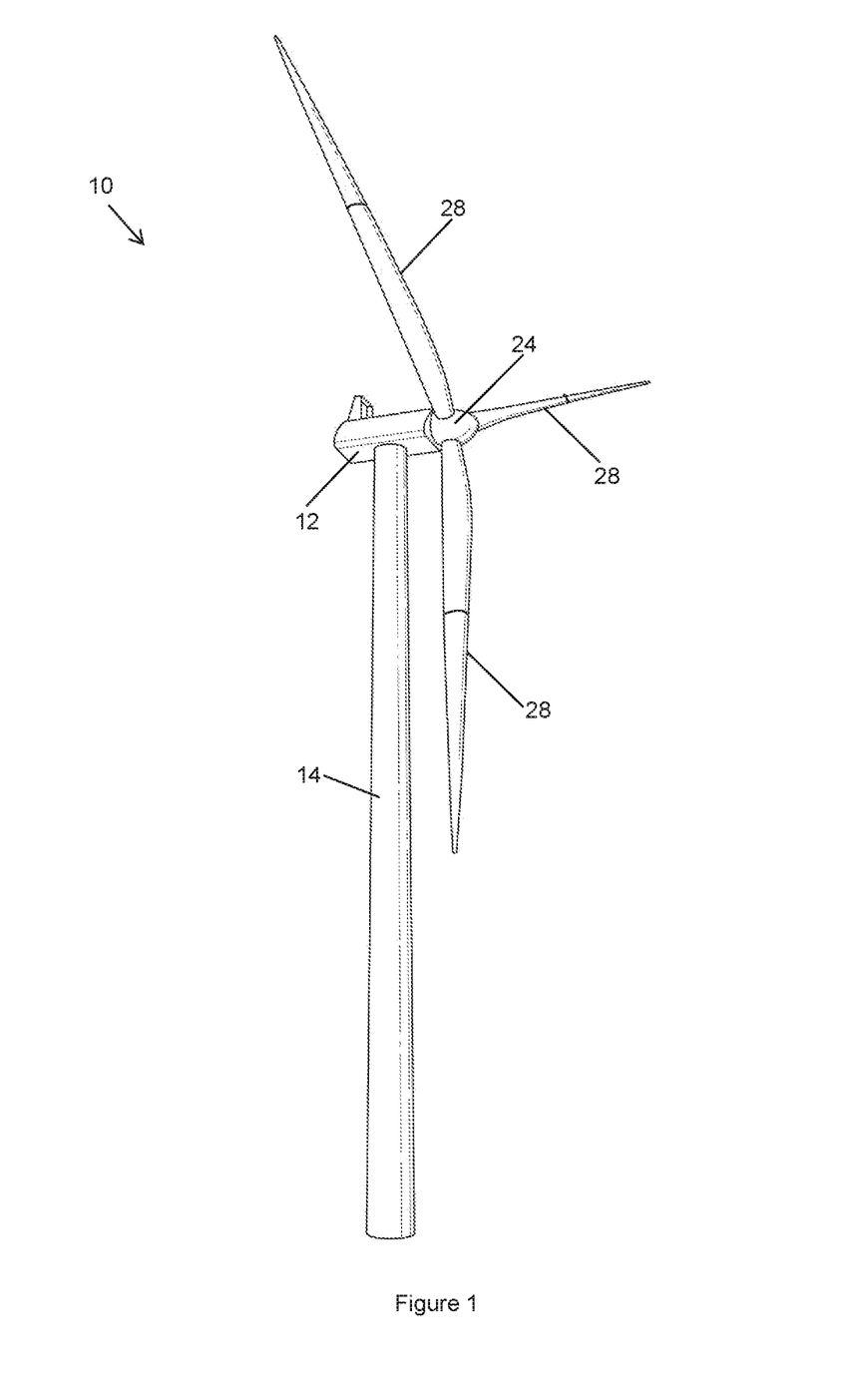
FIG. 1 is a perspective view of a wind turbine.

FIG. 1 shows a wind turbine 10 in which a lubrication pump system in accordance with the invention may be incorporated.

The wind turbine 10 includes a nacelle 12 that is supported on a generally vertical tower 14, which is itself mounted to a foundation (not shown). The nacelle 12 houses a number of functional components, including a gearbox 18 and a generator 20, and supports a main rotor arrangement 22 of the wind turbine 10.

Figure 2:
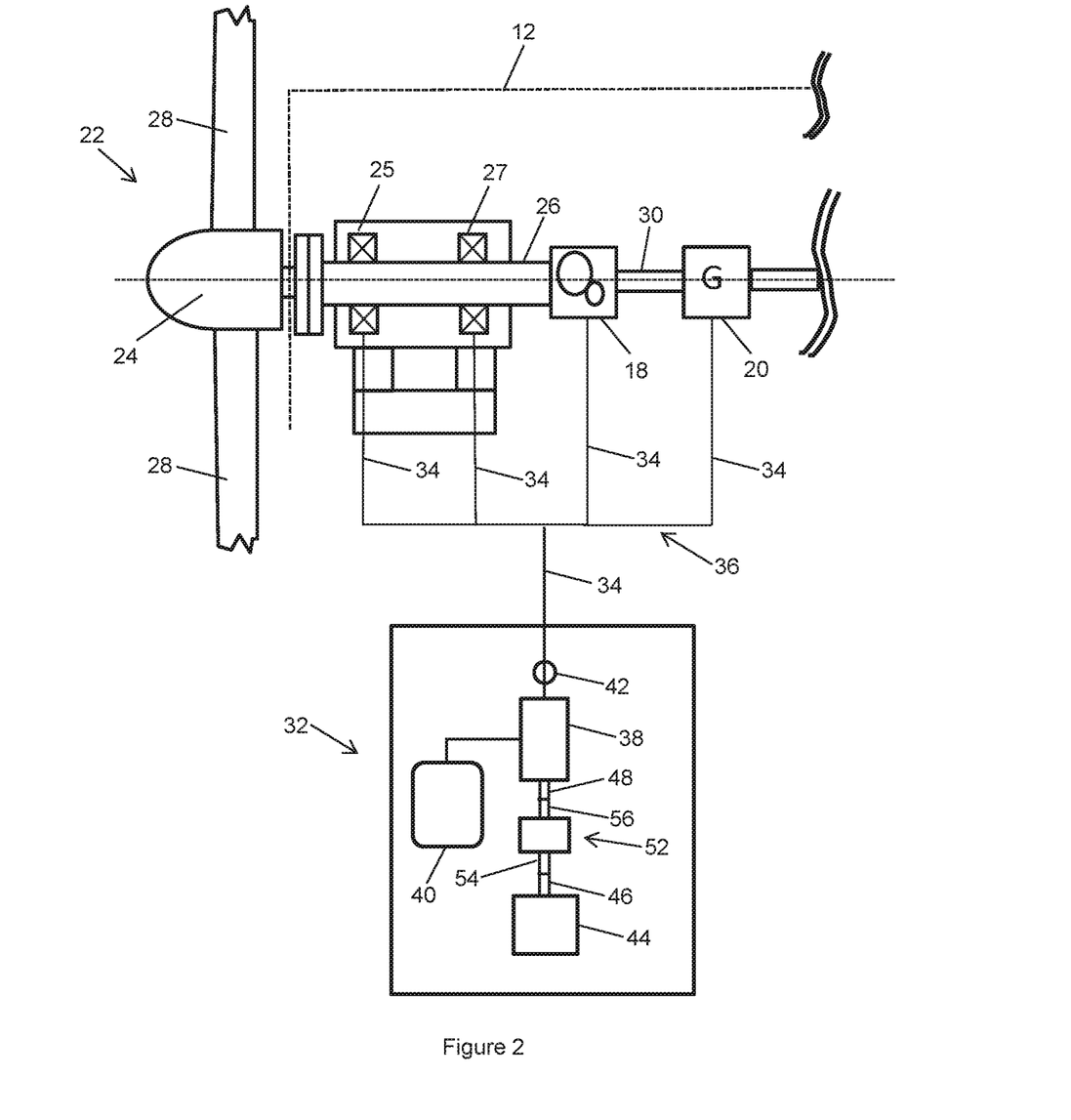
FIG. 2 is a schematic view of a main rotor arrangement and pump system in accordance with a first embodiment of the invention.

Referring now to FIG. 2, which shows one embodiment of a wind turbine configuration, the main rotor arrangement 22 includes a hub 24 coupled to a main rotor shaft 26. The main rotor shaft 26 is rotatably supported by a bearing arrangement comprising a forward bearing 25 and a rear bearing 27. The hub 24 is connected to a plurality of rotor blades 28, in this case three blades, as is typical in a Horizontal Axis Wind Turbine (HAWT). In use, the blades 28 and main rotor shaft 26 rotate, providing input drive to the gearbox 18 that steps up the rotational speed of the main rotor shaft 26 via internal gears (not shown) and drives a high-speed output shaft 30. This in turn drives the generator 20. Electrical energy generated by the generator 20 may then be converted by other components (not shown here) as required before being supplied, for example, to the grid. It should be noted at this point that the system architecture described above is exemplary and is merely intended to provide the reader with context for the invention. So the components discussed so far are not intended to limit the scope of protection defined by the claims. The reader would understand that wind turbines may include other architectures, for example so-called "direct drive" wind turbines that do not use gearboxes between the main rotor shaft 26 and the generator 20 are also known.

Also illustrated in FIG. 2 is a pump system 32 in accordance with an embodiment of the invention. The pump system 32 is a lubrication system for delivering lubricant, e.g. oil, to components of the wind turbine 10. In this example, the lubrication system 32 is connected to the forward and rear bearings 25 and 27, the gearbox 18 and the generator 20, by means of a plurality of fluid lines 34 which together form a fluid circuit 36. The lubrication system 32 also includes a drain line (not shown) for returning lubricant to a reservoir, tank, or sump 40. However, it should be noted that the lubrication system 32 may be configured to supply lubricant to any component, and any number of components, of the wind turbine 10.

The lubrication system 32 includes a lubrication pump 38 that draws lubricant from the sump 40, pressurizes that fluid, and delivers it to components of the wind turbine 10 via the fluid circuit 36. The lubrication pump 38 may be any pump that is appropriate for pumping a suitable lubricant through the fluid circuit 36. For example, the lubrication pump 38 may be a gear pump, a vane pump, a peristaltic pump a piston pump or any other relevant pump. To ensure that fluid is not able to flow back into the lubrication pump 38, a check valve 42 or similar component may be provided which allows fluid to pass through in one direction only.

The lubrication pump 38 is driven by drive means in the form of a motor 44, whose drive shaft 46 drives rotation of a pump drive shaft 48. In use, it is preferable to drive the motor 44 at the speed of rotation for which it is rated, as this is the speed at which the motor 44 operates with its highest efficiency.

During cold start-up of the wind turbine 10, before the lubrication system 32 has warmed up and reached its operating temperature, the lubricant is significantly more viscous than during normal operation owing to its comparatively lower temperature. Thus, pumping of the lubricant through the fluid circuit 36 is more difficult during cold start-up. Furthermore, the higher lubricant viscosity causes the pump losses to be significantly higher than during normal operation, requiring the motor to deliver a higher torque than is necessary during normal operation. In some known lubrication systems in which the pump is driven by means of a motor whose drive shaft directly drives rotation of a pump drive shaft, this requires more torque/power to be supplied from the driving motor.

To avoid this increase in required motor power/size during cold start-up, one solution is to drive the motor, and thus the pump drive shaft, at a lower speed of rotation. However, this is not ideal, as it is important to get out of the cold start-up regime as quickly as possible, and operating a small motor at a reduced speed does not support this objective. Furthermore, as noted already, the motor is less efficient when operated away from its rated speed.

In a set-up in which the pump is directly coupled to the motor, the torque required during cold start-up is a major factor that influences the required motor size. That is, the motor must be significantly over-dimensioned in terms of torque required during normal operation, in order to provide the torque required during cold start-up. However, a large motor will run outside its optimum load area in normal operation and hence run at reduced efficiency. It is therefore of benefit to allow the motor size to be determined by the power/torque needed during normal operation to reduce both component and operational cost.

Using a smaller pump usually requires a VFD to limit motor current and thereby reduce the speed/frequency of the motor during cold start-up. However, this at the same time reduces the power delivered to the pump/lubricant, as well as adding significant cost and complexity to the system.

The lubrication system 32 of the invention addresses the above problems by incorporating a gearbox arrangement 52 between the motor 44 and pump 38 of the system 32. This allows a small pump to run faster at the maximum torque, hence producing more power and reducing cold start-up time.

The gearbox arrangement 52 is arranged to couple the motor 44 to the pump 38, and includes a rotatable input shaft 54 configured to be driven by the motor 44 and a rotatable output shaft 56 configured to drive the pump 38. The input shaft 54 is rotatable in a first direction of rotation and a second direction of rotation when driven by the motor 44, and the speed of rotation of the output shaft 56 is determined by an operational mode of the gearbox arrangement 52. The output shaft 56 and pump drive shaft 48 rotate in the first direction of rotation, regardless of the direction of rotation of the input shaft 54. In some embodiments, the output shaft 56 and pump drive shaft 48, which may be formed as a single component, are rotatable in the first direction of rotation only.

As will be explained in more detail later, the lubrication system 32 can be operated in two modes of operation. In the first mode, the output shaft 56 is configured to rotate in the first direction of rotation at a first speed of rotation, when the input shaft 54 rotates in the first direction of rotation at the first speed of rotation. In the second mode of operation, the output shaft 56 is configured to rotate in the first direction of rotation at a second speed of rotation, when the input shaft 54 rotates in the second direction of rotation at the first speed of rotation.

In this way, the rate at which the pump 38 is driven may be reduced simply by reversing the direction of rotation of the motor 44. This allows for the motor torque/size required during cold start-up to be reduced, without reducing the speed of the motor 44 away from that at which it is rated. Reducing the motor torque required during cold start-up allows the motor size required for the system to be chosen based on the power/torque needed during normal operation, rather than on that required during cold start-up. Thus the lubrication system 32 enables use of a smaller and lower cost motor 44 than would be appropriate in a traditional set-up.

The lubrication system 32 will now be described in more detail with reference to FIGS. 3, 4a and 4b.

In this embodiment of the invention, the motor 44 is an electric motor that may be driven in forward and reverse modes. For the purpose of this disclosure, the direction of rotation of the motor 44 when driven in forward mode will be referred to as the first, or forward, direction. Correspondingly, the direction of rotation of the motor 44 when driven in reverse mode will be referred to as the second, or backward, direction.

Figure 3:
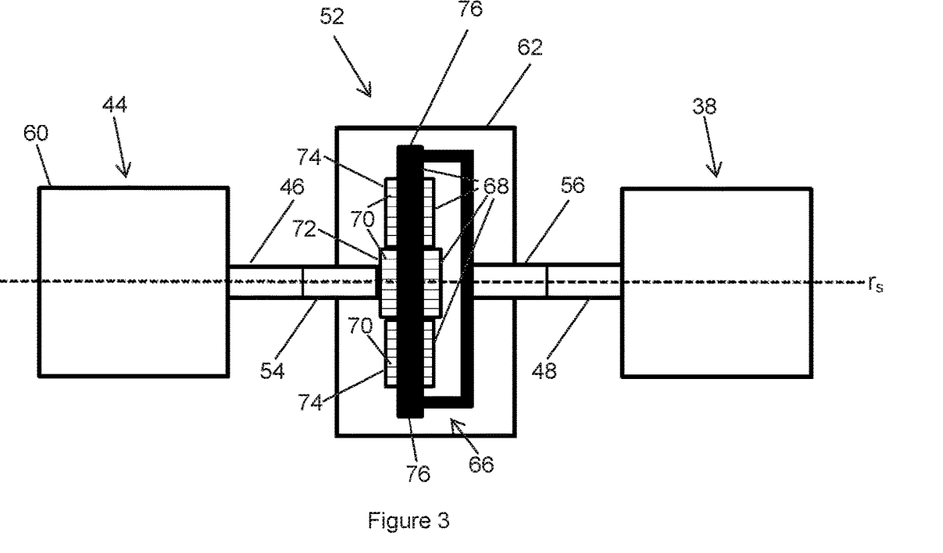
FIG. 3 is a schematic view of the pump system of FIG. 2.

Referring first to FIG. 3, as has already been explained, the motor 44 is coupled to the pump 38 via the gearbox arrangement 52. The motor drive shaft 46 extends from a motor housing 60 to drive the input shaft 54 of the gearbox arrangement 52. The output shaft 56 of the gearbox arrangement 52 is arranged to drive the pump 38. The gearbox arrangement 52 may be housed in a gearbox housing 62 or a bell housing.

The gearbox arrangement 52 further includes a set of gears 66 configured to convert rotation of the input shaft 54 to rotation of the output shaft 56. Specifically, as will be explained in more detail later, the gear set 66 is configured such that rotation of the input shaft 54 in first and second directions, at a first speed, drives rotation of the output shaft 56 in the first direction, but at first and second speeds. In other words, the rotation speed of the output shaft 56, and hence the rate at which the pump 38 is driven, can be varied simply by changing the direction of rotation of the motor 44. As discussed already, this is especially useful during cold start-up of the wind turbine 10 when the lubricant is more viscous than during normal operation, as it allows the motor 44 to be driven at a higher speed and torque without having to increase its power output outside of rated limits.

In the illustrated embodiment, the gear set 66 is an epicyclic gear set, also known as a planetary gear set. This type of arrangement means that the gear set 66 is relatively compact, which may be a benefit in the context of the limited space available within a wind turbine nacelle 12. However, it should be noted here that although an epicyclic gear set is used in this embodiment of the invention, other solutions are possible. For example, a torque converter type arrangement could instead be provided to couple the motor 44 to the lubrication pump 38.

The gear set 66 includes a plurality of gears 68, each gear having a plurality of teeth 70 dimensioned so as to allow the gears 68 to mesh with each other in use. In this particular embodiment the gear set 66 comprises a sun gear 72, three planet gears 74 and a ring gear 76. In other embodiments, the gear set 66 may include more of fewer planet gears 74, whilst still providing similar functionality. In some embodiments the gears may not include teeth 70, but may instead operate through friction.

Figure 4A:
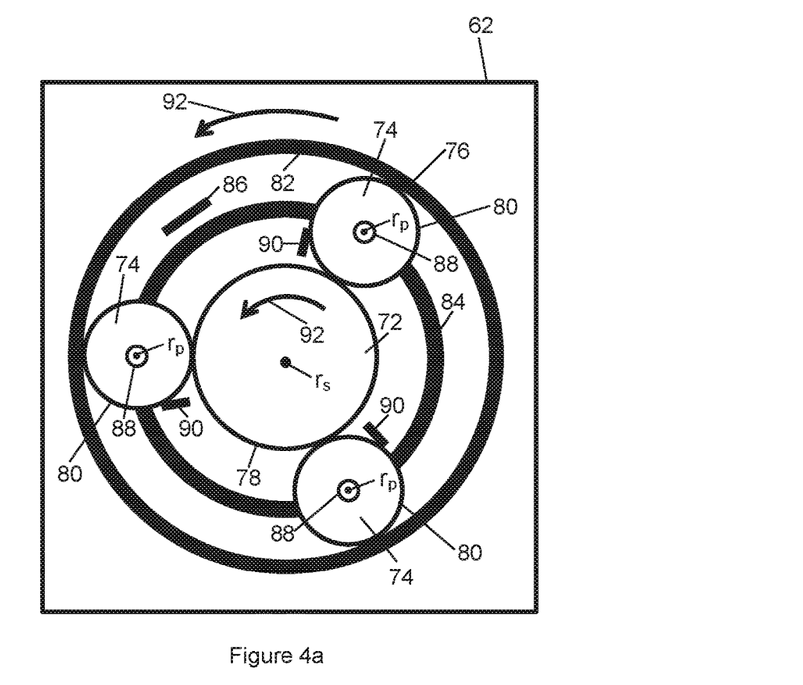
FIG. 4a is a cross-sectional view of a gearbox arrangement of the pump system of FIG. 2, when the system is configured to operate in a first mode of operation.
Figure 4B:
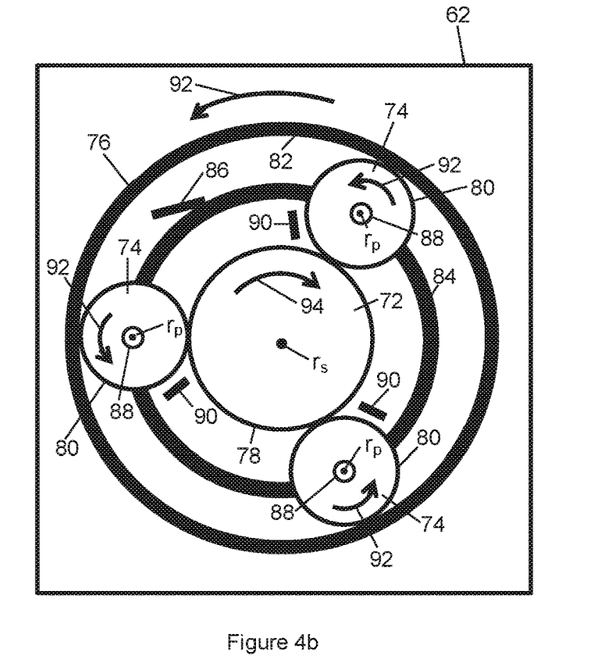
FIG. 4b is a cross-sectional view of a gearbox arrangement of the pump system of FIG. 2, when the system is configured to operate in a second mode of operation.

Although not shown in FIGS. 4a and 4b, the teeth 70 of the sun gear 72 and the planet gears 74 are provided about respective outer circumferences 78 and 80, as illustrated in FIG. 3. The teeth of the ring gear (not shown) are provided about an inner circumference 82 of the ring gear 76. When arranged for use, the teeth 70 of the planet gears 74 engage with the teeth 70 of the sun gear 72 and the teeth of the ring gear 76.

The sun gear 72 is coupled to the input shaft 54 so as to be rotatable with the input shaft 54 about an axis, $r_s$, this axis also defining the central axis of the gear set 66. In this embodiment, the sun gear 72 is directly attached to the input shaft 54. In use, rotation of the motor 44 causes rotation of the input shaft 54 and sun gear 72.

The planet gears 74 are positioned around the sun gear 72, and are arranged so as to be rotatable about a central axis, $r_s$, as well as about individual rotational axes, $r_p$.

The planet gears 74 are mounted on an annular carrier 84 that is rotatable about central axis $r_s$, and are spaced about the circumference of the carrier 84 at equal angles from each other with respect to the central axis, $r_s$. A carrier coupling 86 is provided to allow rotation of the carrier 84 in the first direction, but prevent rotation of the carrier 84 in the second, opposite, direction. The carrier coupling 86 is mounted to the gearbox housing 62 in this embodiment, but in other embodiments may be mounted to another part of the housing that does not rotate relative to the input or output shafts 54, 56. Thus, the carrier coupling 86 operates as a one-way clutch or lock for the carrier 84. The planet gears 74 are mounted on the carrier 84 so as to be rotatable about their respective rotational axes, $r_p$, by means of pins or axles 88.

Each planet gear 74 is provided with a clutch mechanism 90 in the form of a one-way, or unidirectional, freewheel clutch that is configured to allow rotation of its associated planetary gear 74 in the first direction, but prevent rotation in the second direction. Although each planet gear 74 is provided with a clutch mechanism 90 in this embodiment, it should be noted that in other embodiments clutches 90 may be provided for only a selection of the planet gears 74, or for only a single planet gear 74.

In essence, the function of the clutch mechanisms 90 in this embodiment is to lock the rotation of the sun gear 72 to the rotation of the ring gear 76, but only when the sun gear 72 is rotating in the first direction. Thus, the clutch mechanisms 90 act as unidirectional coupling means, or as a sun gear coupling, coupling rotation of the sun gear 72 and ring gear 76 when the sun gear 72 rotates in one direction, but not in the other direction so as to allow relative rotation of the sun gear 72 and the ring gear 76. It should be noted therefore that similar functionality could be provided by a one-way clutch provided between the sun gear 72 and the ring gear 76.

The ring gear 76 is arranged to encircle the planet gears 74, and to be rotatable about the central axis, $r_s$. The ring gear 76 is coupled to the output shaft 56 of the gearbox arrangement 52 such that rotation of the ring gear 76 causes rotation of the output shaft 56, and, in turn, driving of the pump 38. Alternatively, the ring gear 76 may be integrated with the output shaft 56 as a single component to achieve this functionality.

Operation of the lubrication system 32 will now be described with particular reference to FIGS. 4a and 4b.

The lubrication system 32 is configured to operate in two different modes of operation; a first mode and a second mode.

Referring first to FIG. 4a, this illustrates the configuration of the gearbox arrangement 52 as viewed from the position of the motor 44, when the lubrication system 32 is operating in the first mode of operation. In this mode, the gearbox arrangement 52 is configured to convert rotation of the input shaft 54 in the first direction, at the first speed, to rotation of the output shaft 56 in the same direction, at the same speed. The first mode of operation may be used during the normal operating mode of the wind turbine 10, when the lubrication system 32 and associated lubricant is in its normal operating temperature range.

In the first mode of operation, the motor 44 is driven in a forward direction. Here the forward direction is illustrated as counter-clockwise. The motor 44 and motor drive shaft 46 rotate in the first, or forward, direction that is indicated by arrows 92 in FIGS. 4a and 4b, at the first speed of rotation. To provide the reader with context, the first speed of rotation, that is the rotational speed of the motor drive shaft 46, may be, for example, around 1,500 rpm. This motor speed is based on use of a four-pole motor at a frequency of 50 Hz. Other motor speeds are possible, of course, and the skilled person will understand that the speed range at which a motor would be rated to operate is linked to the number of poles in the rotor/stator when considering a standard motor. The first speed of rotation corresponds to the rated speed of the motor 44, that being the speed at which most efficient motor operation is achieved.

Rotation of the motor drive shaft 46 drives rotation of the input shaft 54 of the gearbox arrangement 52, which in turn causes rotation of the sun gear 72 to which the input shaft 54 is attached. If initially clutch mechanisms 90 are disengaged but carrier coupling 86 is engaged, rotation of the sun gear 72 in the forward direction would drive rotation of the planet gears 74 about their central axes, $r_p$, in the opposite direction (i.e. the direction indicated by numeral 94 in FIG. 4b). However, as the planet gears 74 begin to rotate in the second direction, their respective clutch mechanisms 90 engage to prevent further backward rotation. The teeth 70 of the planet gears 74 are now meshed with, and locked in position with respect to, the teeth 70 of the sun gear 72 and the teeth of the ring gear 76. As such, continued forward rotation of the sun gear 72 drives forward rotation of both the carrier 84 and the ring gear 76 about central axis, $r_s$, at the first speed of rotation. Forward rotation of the ring gear 76 at the first speed drives forward rotation of the output shaft 56 at the first speed, which drives the pump 38 to operate at a first pump rate.

Thus, in the first mode of operation, the sun gear 72, carrier 84, and ring gear 76 each rotate in the same direction about central axis, $r_s$, i.e. the first direction, and at the same speed, i.e. the first speed. The input and output shafts 54, 56 therefore rotate at the same speed and the gear ratio in this configuration is 1:1.

Turning now to FIG. 4b, this illustrates the configuration of the gearbox arrangement 52 as viewed from the position of the motor 44, when the lubrication system 32 is operating in the second mode of operation. In the second mode of operation, the gearbox arrangement 52 is configured to convert rotation of the input shaft 54 in the second, or backward, direction, at the first speed, to rotation of the output shaft 56 in the first, or forward, direction, at a second speed. Specifically, in this embodiment, backward rotation of the input shaft 54 at the first speed drives forward rotation of the output shaft 56 at a second, slower speed.

In the second mode of operation, the motor 44 is driven in reverse. The motor 44 and drive shaft 46 rotate in the second, or backward, direction that is indicated by arrow 94 in FIG. 4b. Here, that direction is shown as clockwise. As in the first mode of operation, the motor 44 and drive shaft 46 rotate at the first speed of rotation, at which most efficient operation of the motor 44 is achieved.

Rotation of the motor drive shaft 46 drives rotation of the input shaft 54 and sun gear 72 in the second direction, at the first speed. This backward rotation of the sun gear 72 drives forward rotation of the planet gears 74 about their rotational axes, $r_p$, and the carrier coupling 86 engages to prevent backward rotation of the carrier 84 about central axis, $r_s$. The ring gear 76 is driven to rotate in the forward direction by the forward rotation of the planet gears 74. So, since the carrier 84 is locked in position, i.e. the carrier coupling 86 is engaged, the planet gears 74 are able to rotate, as the clutch mechanisms 90 disengage, which drives the ring gear 76 and output shaft 56 to rotate in the forward direction, in common with the rotational direction of the output shaft 56 in the first mode of operation. Rotation of the output shaft 56 drives the pump 38 to operate at a second pump rate, the second pump rate being lower than the first pump rate in this embodiment.

From the above discussion, it will be apparent that, in the second mode of operation, the sun gear 72 and ring gear 76 rotate at different speeds, in opposite directions. In this arrangement, the gear set 66 is configured to step down the speed of the input shaft 54 when the motor 44 is driven in reverse, so as to drive the output shaft 56 at a lower speed than the input shaft 54. The gear ratio in the second mode of operation is 2:1, in this embodiment, but it should be noted that this is only an example. Other gear ratios are possible, and may be desirable depending on the specific application. In dependence on the relative sizes of the sun and ring gears, 72, 76, the gear ratio may be configured as desired. For example, the gear ratio may be configured to fall in the range of 2:1 to 4:1. More broadly, the gear ratio may be configured to fall in the range of 1.5:1 to 10:1, this broader range corresponding to a practical limit relating a single stage planet gear arrangement and feasibility considerations with regards to the gearing of the motor 44 to the pump 38.

The second mode of operation is intended for use, for example, during cold start-up of the wind turbine 10, when the temperature of the lubricant is lower than during normal operation. As has been explained already, a lower lubricant temperature corresponds to a higher lubricant viscosity, which results in the lubricant being more difficult to pump through the lubrication system 32. To overcome the higher viscosity of the lubricant, a higher torque is required to drive the pump 38 during cold start-up than during normal operation, and also pumping losses are increased.

It is preferred to operate the motor 44 at, or close to, the speed and torque with the highest energy efficiency, which is normally at or close to the nominal or rated speed of the motor 44. However, in known lubrication systems in which a motor drives the pump directly, driving the pump at the same speed during cold start-up as during normal operation would require the motor to deliver more torque (that is, a higher current draw) or be of a larger build size to achieve the required torque. Incorporating a gearbox arrangement 52 between the motor 44 and the pump 38 allows the pump 38 to be driven at a lower speed during cold start-up, without reducing the rotation speed of the motor 44 or significantly increasing the power delivered by the motor 44. In this way, the invention enables a smaller and less expensive motor 44 to be used to execute cold start-up of a lubrication system 32 of a wind turbine 10. Furthermore, because the motor 44 can deliver more power to the pump 38, cold start-up times can be improved (i.e. reduced) due to more efficient operation of the motor 44, and the risk of starving components in the wind turbine 10 that require lubrication of lubricant is reduced.

Figure 5A:
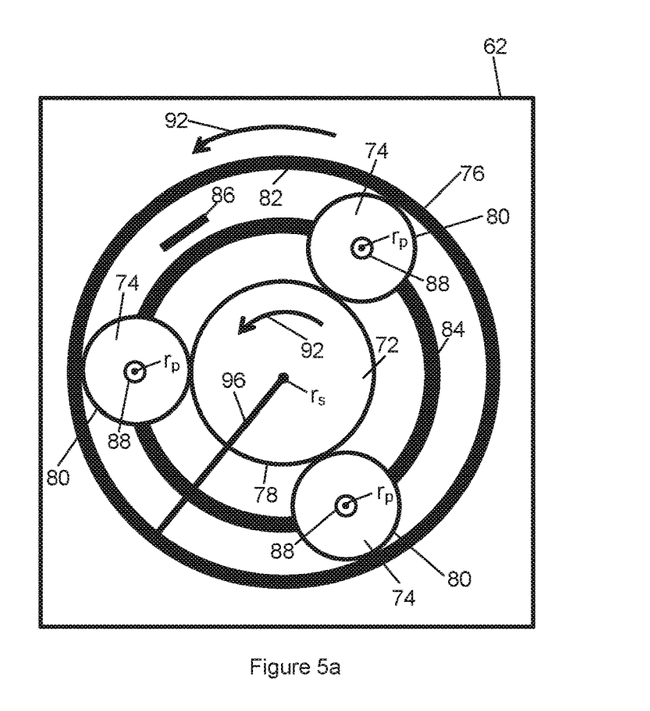
FIG. 5a is a cross-sectional view of a gearbox arrangement of a pump system in accordance with a second embodiment of the invention, when the system is configured to operate in a first mode of operation.
Figure 5B:
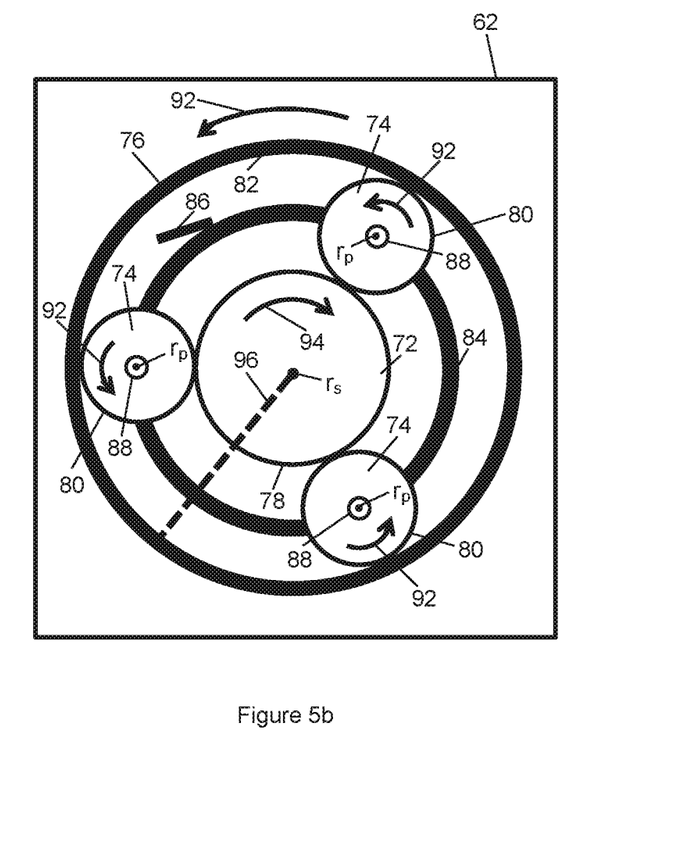
FIG. 5b is a cross-sectional view of a gearbox arrangement of a pump system in accordance with the second embodiment of the invention, when the system is configured to operate in a second mode of operation.

As mentioned above, it is possible to achieve similar functionality as in the above-described embodiment by providing a mechanical coupling, or unidirectional/one-way clutch 96 between the sun gear 72 and the ring gear 76 in place of the clutch mechanisms 90. In this case, with reference to FIG. 5a, forward rotation of the sun gear 72 engages the one-way clutch 96 to rotationally couple the sun gear 72 and the ring gear 76 in the first mode of operation, such that the ring gear 76 rotates in the same direction and at the same speed as the sun gear 72. In FIG. 5a, engagement of the one-way clutch 96 is illustrated by a solid line. Referring now to FIG. 5b, in the second mode of operation, backward rotation of the sun gear 72 disengages the one-way clutch 96 between the sun and ring gears 72, 76, thereby disengaging the rotational coupling between the sun and ring gears 72, 76. In FIG. 5b, disengagement of the one-way clutch 96 is illustrated by a dashed line. The carrier coupling 86 engages to lock the carrier 84 in position with respect to the gearbox housing 62. Rotation of the sun gear 72 drives rotation of the planet gears 74 and, through the planet gears 74, drives rotation of the ring gear 76. The ring gear 76 rotates forwards at a different speed to the sun gear 72, i.e. at the second speed of rotation.

The invention claimed is:

1. A pump system for supplying lubricant to components of a wind turbine, the system comprising:
   a pump for pumping lubricant through a fluid circuit of the wind turbine;
   a drive means for driving the pump; and,
   a gearbox arrangement arranged to couple the drive means to the pump, the gearbox arrangement comprising a rotatable input shaft configured to be driven by the drive means and a rotatable output shaft configured to drive the pump, wherein the input shaft is rotatable in a first direction of rotation and a second direction of rotation when driven by the drive means and the output shaft is rotatable in the first direction of rotation, and wherein the speed of rotation of the output shaft is determined by an operational mode of the gearbox arrangement, such that:
   in a first mode of operation, when the input shaft rotates in the first direction of rotation at a first speed of rotation, the gearbox arrangement is configured to drive the output shaft to rotate also in the first direction of rotation at the first speed of rotation; and
   in a second mode of operation, when the input shaft rotates in the second direction of rotation at the first speed of rotation, the gearbox arrangement is configured to drive the output shaft to rotate in the first direction of rotation at a second speed of rotation.

2. The pump system as claimed in claim 1, wherein the second speed of rotation is lower than the first speed of rotation.

3. The pump system as claimed in claim 1, wherein the gearbox arrangement comprises an epicyclic gear set.

4. The pump system as claimed in claim 3, wherein the epicyclic gear set provides a gear ratio in the range of 2:1 to 4:1 in the second mode of operation, such that the first speed of rotation is in the range of two to four times faster than the second speed of rotation in the second mode of operation.

5. The pump system as claimed in claim 3, wherein the epicyclic gear set comprises a sun gear, a plurality of planet gears and a ring gear, wherein the sun gear is coupled to the input shaft so that rotation of the input shaft drives rotation of the sun gear and the ring gear is coupled to the output shaft so that rotation of the ring gear drives rotation of the output shaft.

6. The pump system as claimed in claim 5, wherein the planet gears are mounted on a carrier so as to be rotatable about rotational axis, $r_p$, and about a central axis of the gear set, $r_s$, and wherein the gearbox arrangement comprises a carrier coupling configured to allow rotation of the carrier about central axis, $r_s$, in the first direction and prevent rotation of the carrier about central axis, $r_s$, in the second direction.

7. The pump system as claimed in claim 5, wherein the gearbox arrangement comprises a sun gear coupling configured to rotationally couple the sun gear and the ring gear when the sun gear rotates in the first direction of rotation, but to allow relative rotation between the sun gear and the ring gear when the sun gear rotates in the second direction of rotation.

8. The pump system as claimed in claim 7, wherein the sun gear coupling comprises a unidirectional clutch associated with at least one of said planet gears and configured to allow rotation of the planet gear about its rotational axis, $r_p$, in the first direction and prevent rotation of the planet gear about its rotational axis, $r_p$, in the second direction.

9. The pump system as claimed in claim 7, wherein the sun gear coupling comprises a mechanical coupling configured to directly couple rotation of the sun and ring gears when the sun gear rotates in the first direction of rotation, but to allow relative rotation between the sun gear and the ring gear when the sun gear rotates in the second direction of rotation.

10. A wind turbine comprising a pump system as claimed in claim 1.

11. The pump system as claimed in claim 1, wherein the drive means is an electric motor.

* * * * *